UNITED STATES PATENT OFFICE.

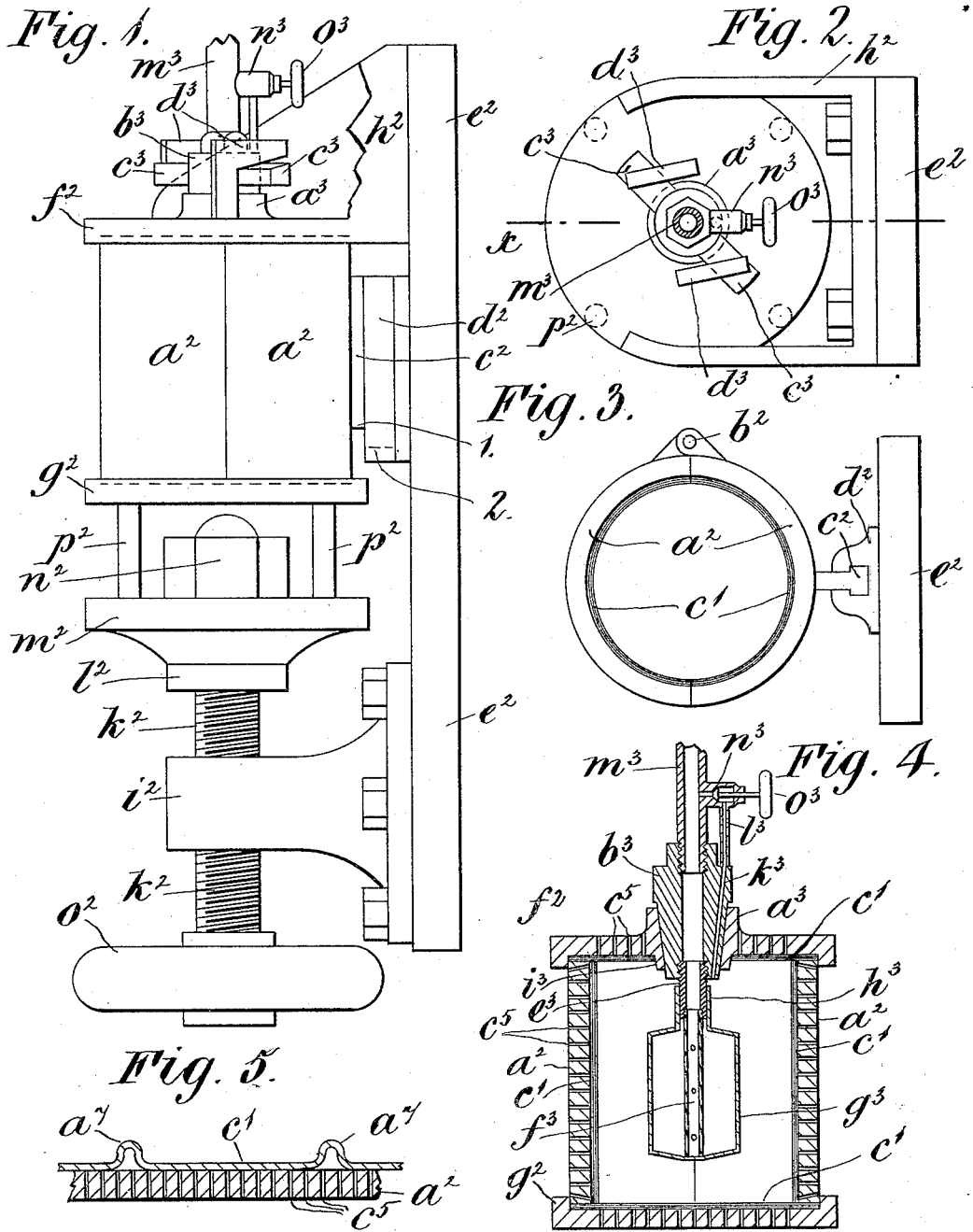

FRANK B. HOWARD, OF MONTREAL, QUEBEC, CANADA.

APPARATUS FOR MANUFACTURING HOLLOW WARE FROM PULP.

SPECIFICATION forming part of Letters Patent No. 398,397, dated February 26, 1889.

Application filed July 21, 1887. Serial No. 244,882. (No model.)

*To all whom it may concern:*

Be it known that I, FRANK BENONA HOWARD, a citizen of the United States, residing at the city of Montreal, in the district of Montreal and Province of Quebec, Canada, have invented new and useful Improvements in Apparatus for Manufacturing Hollow Ware from Pulp; and I do hereby declare that the following is a full, clear, and exact description of the same.

This invention has reference to improvements in the apparatus by which pulp is pressed into shape to form hollow articles or hollow ware; and it consists in the construction and combination of parts hereinafter claimed, by which the atmospheric pressure on the exterior of the article formed in a mold by the inflation of an elastic bag within the mold is prevented from causing any damage to the article formed of pulp at the time when the bag is caused to collapse.

In the drawings hereunto annexed similar letters of reference indicate like parts.

Figure 1 is an elevation of an apparatus for forming kegs, barrels, and other cylindrical "inclosed vessels" having the heads or ends made integral with the body or sides or cylindrical part. Fig. 2 is a plan of the apparatus shown in Fig. 1. Fig. 3 is a plan of the mold $a^2\ a^2$, showing the means for attaching it to the bed. Fig. 4 is a vertical central section of the mold, taken at line $x$, Fig. 2. Fig. 5 is a detail of construction.

$a^2\ a^2$ is a cylindrical mold made in halves, or more parts, if desired, hinged together, as shown at $b^2$. The walls of this mold are perforated throughout. One of the halves $a^2$ is provided with a T projection, $c^2$, received in a bracket, $d^2$, attached to or made in one piece with a bed or frame, $e^2$.

$f^2$ is the upper head, and $g^2$ the lower head, of the mold. As shown, the head $f^2$ is held by a bracket, $h^2$, bolted to the bed $e^2$.

$i^2$ is a bracket, also bolted to the bed $e^2$. This is provided with an eye threaded to receive a screw, $k^2$, provided with a collar, $l^2$. Above the collar is placed on the screw an annulus, $m^2$, and upon the end of the screw projecting above the annulus is a nut, $n^2$. This is so arranged that the screw $k^2$ may be revolved freely by the wheel $o^2$, while the annulus $m^2$ does not revolve. The annulus $m^2$ is attached to the head $g^2$ by pillows $p^2$, so that by the screw $k^2$ being operated the head $g^2$ may be raised and lowered.

By properly situating the height of the bracket $d^2$ it will allow the mold to descend until the lower end, 1, will reach the level at 2, where it is stopped. This will disengage the upper end of the mold from the head $f^2$, recessed to receive it.

After the mold has descended the distance from 1 to 2, if the screw $k^2$ is operated further, it causes a further descent of the head $g^2$ and withdraws the head $g^2$ from the lower end of the mold, separating it from the recess therein, and enabling the cylindrical part of the mold to be opened on the hinges $b^2$. When it is desired to close the mold, the two halves $a^2$ are swung together and the screw $k^2$ run up, to bring the parts together in the position shown in Fig. 1, when the recesses in the heads $f^2$ and $g^2$ firmly lock the two halves $a^2$ together.

In the head $f^2$ an opening surrounded by a neck, $a^3$, is provided, forming a socket to receive a nipple, $b^3$, fitted to form a tight joint therewith.

The nipple $b^3$ is provided with projections $c^3$, arranged to engage and wedge under inclined lugs $d^3$, attached on the head $f^2$. By this means the nipple $b^3$ is firmly held in the neck or socket $a^3$. In the lower end of the nipple is secured a thimble, $e^3$. Into this is screwed a perforated pipe, $f^3$. Over this is placed the elastic body or bag $g^3$, the neck $h^3$ of which is secured on the thimble $e^3$.

$i^3$ is a small neck projecting on the under side of the head $f^2$ a sufficient amount to be somewhat longer than the thickness of the head of the keg or other vessel being formed.

It will be observed that the parts are so arranged that when together the elastic bag $g^3$ is about centrally situated in the mold.

In the wall of the nipple $b^3$ a small passage, $k^3$, is formed, to which is connected a pipe, $l^3$. This extends the passage $k^3$ and connects it to a projection, $n^3$, formed on a pipe, $m^3$, screwed into the upper end of the nipple $b^3$. The passage $k^3$ extends through the projection $n^3$, which is provided with a stop-valve or stop-cock, $o^3$, by which the passage $k^3$ may be opened and closed at pleasure, thus making, when desired, a communication between the pipe $m^3$ and the inside of the mold.

$c'$ is the filter-lining, which may be of the ordinary description, and $c^5$ are the perforations in the body and heads of the mold.

If the vessel to be formed should be desired to be square or any other ordinary shape instead of cylindrical, the mold will be correspondingly formed.

When it is desired to form an "inclosed article" from pulp, the bag $g^3$ is caused to collapse by exhausting the air by the pipe $m^3$. The nipple $b^3$ is removed from the neck $a^3$. The thimble $e^3$ is unscrewed and removed from the nipple $b^3$, and with it the bag $g^3$ and pipe $f^3$. The nipple $b^3$ is again secured in the neck $a^3$ and semi-fluid pulp forced into the mold by any ordinary means—such as a force-pump, head, &c.—until a sufficient amount of pulp is therein contained to form the vessel required. When this has been done, the nipple $b^3$ is again removed from the neck $a^3$, the thimble $e^3$, pipe $f^3$, and bag $g^3$ are again attached to the nipple $b^3$, and, the bag $g^3$ having been collapsed, the nipple $b^3$ is again put in place, bringing the bag to the required position in the mold, or as shown in Fig. 4, whereupon it is expanded as desired to press the pulp upon the inner surfaces of the mold. If it is desired to save the trouble of removing the thimble $e^3$ from the end of nipple $b^3$ and save the loss of time that will arise from having to pass alternately semi-fluid pulp and air or other expanding mediums through the same pipe, $m^3$, and nipple $b^3$, a second pipe, $m^3$, and nipple $b^3$, not having the thimble $e^3$, pipe $f^3$, bag $g^3$, and passage $k^3$, may be provided and introduced into the neck $a^3$, for the purpose of charging the mold with semi-fluid pulp under pressure. When the pulp vessel has been sufficiently formed by the pressure caused by expanding the bag $g^3$, the heavy pressure in the pipe $m^3$ is taken off the bag, but not to such an extent that the bag will return from its extended state. As soon as the said heavy pressure is off the bag, the valve $o^3$ is opened, allowing the air to pass down the passage $k^3$ and prevent a vacuum being formed in the pulp vessel, for if a vacuum is formed, the vessel being yet wet and soft, it is in danger of being injured thereby. This is an important improvement in the present invention. The bag $g^3$, having returned from its expanded state, is now caused to collapse and the nipple $b^3$ is removed, drawing the bag $g^3$ out through the neck $a^3$. The neck $i^3$ protects the opening in the head of the vessel from being injured by the bag $g^3$ when it is being withdrawn, as above stated. The mold is next opened and the pulp vessel is removed therefrom.

With regard to the filter-lining $c'$, hereinabove mentioned, I prefer to use for this purpose three plies of wire-cloth of different meshes, the finest one being on the inside, and being of brass wire of from one hundred to one hundred and forty meshes to the inch, according to the pressure used, while the outer ones will be about fifty and twenty-five mesh to the inch.

If it is desired to form a pattern or mark, figure or letter, &c., upon the hollow articles of pulp made in the mold, as above described, it is only necessary to emboss the wire-cloth filter-lining $c'$ by impressing the pattern, mark, letter or letters, &c., upon or into it, or adding extra thicknesses of wire-cloth upon its surface to cause projections $a^7$ (see Fig. 5) of the configuration required to give the desired pattern, letter or letters, or mark, &c.; or this may be done by attaching to the surface of the filter-lining any desired letter, figure, or pattern formed in any suitable material, such as metal, &c.

What I claim is as follows:

In an apparatus for the manufacture of articles from pulp, the combination, with a perforated mold and filter-lining, of an elastic bag within said mold and a pipe for conveying air to the inside of said bag for expanding the same, said pipe being further provided with a passage forming a connection between the inside of the said pipe and the inside of the mold and provided with a stop-valve, by which the passage may be opened and closed, the whole substantially as described, for the purposes set forth.

FRANK B. HOWARD.

Witnesses:
CHARLES G. C. SIMPSON,
W. DÉCAICE.